(12) United States Patent
Xing et al.

(10) Patent No.: US 12,060,272 B2
(45) Date of Patent: Aug. 13, 2024

(54) METHOD OF FORMING CONFORMABLE NANOSCALE COATINGS ON SUBSTRATES

(71) Applicants: Yangchuan Xing, Columbia, MO (US); Ahmed M. Jasim, Columbia, MO (US)

(72) Inventors: Yangchuan Xing, Columbia, MO (US); Ahmed M. Jasim, Columbia, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 745 days.

(21) Appl. No.: 16/960,214

(22) PCT Filed: Jan. 11, 2019

(86) PCT No.: PCT/US2019/013166
§ 371 (c)(1),
(2) Date: Jul. 6, 2020

(87) PCT Pub. No.: WO2019/140169
PCT Pub. Date: Jul. 18, 2019

(65) Prior Publication Data
US 2021/0061662 A1 Mar. 4, 2021

Related U.S. Application Data

(60) Provisional application No. 62/616,026, filed on Jan. 11, 2018.

(51) Int. Cl.
*C01B 32/16* (2017.01)
*C01B 32/168* (2017.01)
*C01G 53/00* (2006.01)
*C09C 1/24* (2006.01)
(Continued)

(52) U.S. Cl.
CPC ............ *C01B 32/168* (2017.08); *C01G 53/42* (2013.01); *C09C 1/24* (2013.01); *C09C 1/3661* (2013.01);
(Continued)

(58) Field of Classification Search
CPC ........ B01J 20/30; B01J 20/32; B01J 20/3214; B01J 20/3231; B01J 20/3234; B01J 20/3236; B05D 5/12
See application file for complete search history.

(56) References Cited

U.S. PATENT DOCUMENTS 6,984,591 B1 1/2006 Buchanan et al.
7,518,246 B2 4/2009 Ahn et al.
(Continued)

OTHER PUBLICATIONS

Fu et al. "Synthesis of titania-coated silica nanoparticles using nonionic water-in-oil microemulsion" (2001).*
(Continued)

*Primary Examiner* — Austin Murata
(74) *Attorney, Agent, or Firm* — STINSON LLP (57) ABSTRACT

A method is disclosed for forming nanoscale coatings on a solid substrate surface. In certain embodiments, the method includes the following steps: contacting a substrate with a first liquid organic solvent; adding a liquid agent to the first liquid organic solvent to form a liquid agent film on a surface of the substrate; and adding the nanocoating precursor in the first liquid organic solvent to react the nanocoating precursor with the liquid agent to form the nanocoating on the surface of the substrate.

27 Claims, 8 Drawing Sheets

(51) Int. Cl.
*C09C 1/36* (2006.01)
*C09C 1/56* (2006.01)
*H01M 4/36* (2006.01)
*H01M 4/52* (2010.01)
*H01M 4/62* (2006.01)
*H01M 10/0525* (2010.01)
*H01M 4/02* (2006.01)

(52) U.S. Cl.
CPC ............... *C09C 1/56* (2013.01); *H01M 4/366* (2013.01); *H01M 4/523* (2013.01); *H01M 4/62* (2013.01); *H01M 10/0525* (2013.01); *C01P 2002/88* (2013.01); *C01P 2004/64* (2013.01); *C01P 2004/86* (2013.01); *C01P 2006/40* (2013.01); *H01M 2004/028* (2013.01)

(56) References Cited

U.S. PATENT DOCUMENTS

| | | | |
|---|---|---|---|
| 8,221,852 | B2 | 7/2012 | Heys et al. |
| 2008/0090010 | A1 | 4/2008 | Zhang et al. |
| 2008/0095852 | A1* | 4/2008 | Kong .................. A61K 51/1244 977/773 |
| 2008/0242785 | A1 | 10/2008 | Ma et al. |
| 2009/0062450 | A1 | 3/2009 | Feeney et al. |
| 2009/0226742 | A1 | 9/2009 | Blum et al. |
| 2011/0117286 | A1 | 5/2011 | Chapel et al. |
| 2012/0267605 | A1* | 10/2012 | Zhang ............... H01L 21/02568 977/932 |
| 2014/0272432 | A1 | 9/2014 | Dodge et al. |

OTHER PUBLICATIONS

International Search Report and Written Opinion for related PCT Application, PCT/US19/13166 with a mailing date of Apr. 15, 2019 (11 pgs).

Jasim, et al., "Nano-layer deposition of metal oxides via a condensed water film", Communications Materials, https://doi.org/10.1038/s43246-020-0010-9, www.nature.com/commsmat, 2020 (7 pgs).

Wu, et al., "Atomic Layer Deposition from Dissolved Precursors", Nano Letters, vol. 15, 2015 (7 pgs).

* cited by examiner

METHOD OF FORMING CONFORMABLE NANOSCALE COATINGS ON SUBSTRATES

CROSS-REFERENCE TO RELATED APPLICATIONS

This application is based on and claims priority to U.S. Provisional Application Ser. No. 62/616,026 filed on Jan. 11, 2018, which is hereby incorporated herein by reference.

STATEMENT REGARDING FEDERALLY SPONSORED RESEARCH OR DEVELOPMENT

This invention was made with government support under grant number DE-EE0007282 awarded by the Department of Energy. The government of the United States has certain rights in the invention.

BACKGROUND OF THE INVENTION

1. Field of the Invention

The present invention relates to a method of forming a conformable nanocoating on a substrate.

2. Description of Related Art

Certain products and materials that are nanocoated may have improved characteristics as compared to products and materials that are not nanocoated, including but not limited to, improved hydrophobicity, corrosion resistance, and durability. Nanocoating may also lend specific functions to a product, including but not limited to: selective gas permeation, ion conduction, and surface texturing. Nanocoatings are utilized in a variety of industries and to manufacture a variety of products. Examples include: plastic food packaging with oxygen blocking nanocoatings, batteries that are nanocoated to improve stabilization, engine parts that are nanocoated to improve corrosion resistance and wear, and textiles with hydrophobic nanocoatings to improve water resistance.

The most common and widely utilized technique to form nanocoatings is atomic layer deposition (ALD). ALD requires the use of a chemical precursor that can be vaporized into a carrier gas so that the chemical precursor may react with a gaseous agent (e.g., water vapor) on the surface of a substrate in order to form a coating on the surface of the substrate. By alternating between 1) exposing a substrate to the vaporized chemical precursor and 2) exposing the substrate to a purge gas with a gaseous agent (e.g., water vapor), the chemical precursor can react with the surface water that adsorbs to the surface of the substrate, thereby forming a nanocoating one layer at a time.

There are numerous drawbacks associated with ALD. The equipment required is often expensive. Additionally, the availability of gas phase chemical precursors is often limited. Further, the deposition efficiency of gas phase chemical precursors on a substrate's surface is often low. Moreover, because it is often difficult, if not impossible, to disperse a substrate to be coated into a gas phase, the nanocoatings formed by ALD frequently lack uniformity. Furthermore, the process of forming a nanocoating by ALD is often time-intensive due to the fact that numerous deposition cycles (e.g., hundreds or thousands of deposition cycles) may be required in order to achieve thicknesses of even 10-30 nanometers.

BRIEF SUMMARY OF THE INVENTION

In a first aspect, the present invention is directed to a method of forming a nanocoating on a substrate. The method includes the steps of contacting a substrate with a first liquid organic solvent; adding a liquid agent to the first liquid organic solvent to form a liquid agent film on a surface of the substrate; and adding a nanocoating precursor in the first liquid organic solvent, wherein the nanocoating precursor reacts with the liquid agent film to form the nanocoating on the surface of the substrate.

In certain embodiments, the affinity or attraction between the liquid agent and the substrate is higher relative to the affinity or attraction between the liquid agent and the first liquid organic solvent. More preferably, the liquid agent has a low solubility in the first liquid organic solvent.

In certain embodiments, the step of adding the nanocoating precursor in the first liquid organic solvent includes dissolving the nanocoating precursor in the first liquid organic solvent. More preferably, prior to adding the nanocoating precursor into the first liquid organic solvent, the nanocoating precursor is dissolved in a second liquid organic solvent, and the step of adding the nanocoating precursor in the first liquid organic solvent further includes adding the combination of the nanocoating precursor and the second liquid organic solvent.

In certain embodiments, the contacting step includes dispersing the substrate in the first liquid organic solvent to form a dispersion.

In certain embodiments, a solid volume fraction of the dispersion is preferably between about 0.0001% and about 50%, more preferably about 0.001% and about 10%, and most preferably about 0.01% and 0.1%.

In certain embodiments, the contacting step includes dipping or immersing the substrate in the first liquid organic solvent.

In certain embodiments, the contacting step includes spin-coating the substrate in the first liquid organic solvent.

In certain embodiments, the substrate is selected from the group consisting of nanoparticles, nanofibers, microparticles, microfibers, macroscopic surfaces, and combinations thereof. Preferably, the substrate is selected from the group consisting of carbon, metal oxides, metals, ceramics, polymers, and combinations thereof. In certain aspects, the substrate is selected from the group consisting of carbon nanotubes (CNTs), iron oxide nanoparticles, P25 titania nanoparticles, carbon black (CB), Ni-rich Li-ion cathode powders, silicon powders, silicon nanowires, and combinations thereof.

In certain embodiments, the substrate is hydrophilic. Preferably, the liquid agent is water. Preferably, the hydrophilic substrate is selected from the group consisting of hydrophilic nanoparticles, hydrophilic nanofibers, hydrophilic microparticles, hydrophilic microfibers, hydrophilic macroscopic surfaces, and combinations thereof.

In certain embodiments, the nanocoating precursor is one or more metalorganics. Preferably, the metalorganics are selected from the group consisting of metal alkoxides, metal alkyls, derivatives of metal alkoxides, derivatives of metal alkyls, and combinations thereof. In certain aspects, the metalorganics are selected from the group consisting of titanium ethoxide, titanium tetraisoproxide, trimethyl aluminum, diethyl zinc, niobium ethoxide, and combinations thereof.

In certain embodiments, the first liquid organic solvent and the second liquid organic solvent are each selected from the group consisting of: alkanes, alkenes, alkynes; aliphatic derivatives of alkanes, alkenes, alkynes; aromatic derivatives of alkanes, alkenes, alkynes; and combinations thereof. Preferably, the first liquid organic solvent and the second liquid organic solvent are each one or more alkylbenzenes, alkylcyclohexanes, and combinations thereof. Preferably, the first liquid organic solvent and the second liquid organic solvent are the same.

In certain embodiments, the nanocoating is selected from the group consisting of metal oxide, metal hydroxide, and combinations thereof. In certain aspects, the nanocoating is selected from the group consisting of titania, niobium oxide, niobia, alumina, and combinations thereof.

In certain embodiments, the liquid agent is a water solution containing one or more solutes. Preferably, the one or more solutes is one or more metal salts.

In a second aspect, the present invention is directed to a nanocoated substrate. The nanocoated substrate is formed by the following steps: contacting a substrate with a first liquid organic solvent; adding a liquid agent to the first liquid organic solvent to form a liquid agent film on a surface of the substrate; and adding a nanocoating precursor in the first liquid organic solvent, wherein the nanocoating precursor reacts with the liquid agent film to form a nanocoating on the surface of the substrate.

Additional aspects of the invention, together with the advantages and novel features appurtenant thereto, will be set forth in part in the description that follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

The present invention is directed to a method of forming a nanocoating on a substrate. The method includes the following steps: contacting a substrate with a first liquid organic solvent; adding a liquid agent to the first liquid organic solvent to form a liquid agent film on a surface of the substrate; and adding a nanocoating precursor in the first liquid organic solvent to react the nanocoating precursor with the liquid agent film to form the nanocoating on the substrate. The first liquid organic solvent acts as a carrier solvent for the chemical precursor so that the chemical precursor may react with the liquid agent film on the surface of the substrate. It should be understood that the step of adding the nanocoating precursor to the first liquid organic solvent may be performed either before or after the contacting the substrate with the first liquid organic solvent.

In certain embodiments, the step of adding a liquid agent to the first liquid organic solvent is performed after the step of contacting a substrate with the first liquid organic solvent. In certain embodiments, the step of adding a liquid agent to the first liquid organic solvent is performed before the step of contacting a substrate with the first liquid organic solvent.

The present invention does not present the drawbacks associated with ALD. The equipment required is inexpensive. Additionally, the availability of liquid phase precursors is not limited. Further, the deposition efficiency of liquid phase precursors on a substrate's surface is high. Moreover, the nanocoatings formed are uniform due to the fact that the substrate may be readily submersed in the first liquid organic solvent. Furthermore, the method is not time-intensive. In a typical process, a nanocoating can be formed in a time span of preferably 5 minutes to 2 hours, more preferably 5 minutes to an hour, and most preferably 5 minutes to 30 minutes. It was surprisingly found that the method of the present invention can produce nanocoatings of at least 100 nanometers in one treatment.

In one aspect of the invention, the affinity or attraction between the liquid agent and the substrate is higher relative to the affinity or attraction between the liquid agent and the first liquid organic solvent in order that the liquid agent film may more readily form on the surface of the substrate. The difference in the relative affinities can be increased in one or more ways. For example, the substrate and the liquid agent chosen may naturally have an affinity or attraction for one another that is higher relative to the affinity or attraction between the liquid agent and the first liquid organic solvent. This can be accomplished, for example, by using a hydrophilic substrate, water as the liquid agent, and a hydrocarbon organic solvent in which liquid water is not readily soluble. As another example, the substrate may have a surface with defects (i.e.—surface abnormalities) in order that the liquid agent film may more readily nucleate on the surface of the substrate. As yet another example, the liquid agent may be either insoluble or have low solubility (e.g., less than 100 part per million (ppm)) in the first liquid organic solvent. In this way, the liquid agent and the first liquid organic solvent will tend to repel one another in order that the liquid agent film may more readily form on the surface of the substrate. It should be understood that the solubility of the liquid agent in the first liquid organic solvent may be adjusted by adjusting the temperature of the first liquid organic solvent.

In certain embodiments, the step of adding the nanocoating precursor in the first liquid organic solvent includes dissolving the nanocoating precursor in the first liquid organic solvent.

In certain embodiments, the method includes the additional step of dissolving the nanocoating precursor in a second liquid organic solvent prior to adding the nanocoating precursor in the first liquid organic solvent. In certain embodiments, the combination of the nanocoating precursor and the second liquid organic solvent is then added to the first liquid organic solvent during the step of adding the nanocoating precursor in the first liquid organic solvent. In one aspect, the second liquid organic solvent is injected into the first liquid organic solvent. Alternatively, the nanocoating precursor may be dissolved directly into the first liquid solvent. The second liquid solvent is miscible with and may be the same as or different than the first liquid solvent.

In certain embodiments, the contacting step includes dispersing the substrate in the first liquid organic solvent. In certain embodiments, the substrate may be dispersed in the first liquid organic solvent via mechanical stirring, sonication, dispersants, surfactants, and combinations thereof. The solid volume fraction of the dispersion may be preferably between about 0.0001% and about 50%, more preferably about 0.001% and 10%, and most preferably about 0.01% and 0.1%. In other embodiments, the contacting step includes dipping or immersing the substrate in the first liquid organic solvent, and these embodiments may be particularly suited for substrates that may be macroscopic, as discussed below. In still other embodiments, the contacting step includes spin-coating the substrate in the first liquid organic solvent.

The substrate may be one or more particles, fibers, or macroscopic surfaces. Such substrates may be nanoparticles, nanofibers, microparticles, microfibers, or combinations thereof. The size of such substrates may range from 1 nanometer up to 20 centimeters. Suitable substrates include, but are not limited to, carbon (e.g., carbon nanotubes (CNTs), carbon black (CB)), metal oxides (e.g., iron oxide nanoparticles, P25 titania nanoparticles), metals, ceramics, polymers, Ni-rich Li-ion battery electrode powders, silicon powders, and silicon nanowires.

The first and second liquid organic solvents may each independently be an alkane, alkene, or alkyne; an aliphatic derivative of an alkane, alkene, or alkyne; an aromatic derivative of an alkane, alkene, alkyne; an alkylbenzene; an alkylcyclohexane; and combinations thereof. Suitable liquid organic solvents include, but are not limited to, hexane and heptane. The first and second liquid organic solvents may be the same or different.

In certain embodiments, the liquid agent is liquid water. The substrate may be hydrophilic. The term "hydrophilic," as used herein, refers to any molecule or material that has an affinity for or attraction to liquid water. The term "hydrophilic substrate," as used herein, refers to any substrate with a surface that is hydrophilic or that can be made hydrophilic through surface functionalization. It should be understood that some hydrophilic substrates will have a greater affinity for or attraction to liquid water than other hydrophilic substrates which will cause the liquid water to form the liquid water film on the substrate. In certain embodiments, the hydrophilic substrate may be one or more hydrophilic nanoparticles, hydrophilic nanofibers, hydrophilic microparticles, hydrophilic microfibers, hydrophilic macroscopic surfaces, and combinations thereof. The solubility of water in the liquid organic solvents utilized should be low, preferably less than 100 ppm at a given temperature.

In certain embodiments, the liquid agent may be a water solution containing one or more solutes. Suitable solutes include, but are not limited to, metal salts.

In certain embodiments, the nanocoating precursor is a liquid at room temperature. In other embodiments, the nanocoating precursor is a solid or gas. The nanocoating precursors may be wholly or partially dissolved in the first or second organic solvent.

In certain embodiments, the nanocoating precursor is one or more metalorganics. Suitable types of metalorganics include, but are not limited to metal alkoxides, metal alkyls, derivatives of metal alkoxides, derivatives of metal alkoxides, derivatives of metal alkyls, and combinations thereof. Suitable metalorganics include, but are not limited to titanium ethoxide, titanium tetraisoproxide, trimethyl aluminum, diethyl zinc, niobium ethoxide, and combinations thereof. The metalorganic and liquid agent are selected so that the metalorganic will react with the liquid agent to form the nanocoating.

In certain embodiments, the nanocoating is one or more metal oxides, metal hydroxides, or combinations thereof. Suitable nanocoatings include, but are not limited to, titania, niobium oxide, niobia, alumina, zirconia and combinations thereof.

The thickness of the nanocoatings formed by the method of the present invention will be determined by the amount of the limiting reagent (i.e., the liquid agent or the nanocoating precursor). Accordingly, the expected nanocoating thickness can be estimated or calculated in advance of the nanocoating formation, as will be understood by one of ordinary skill in the art and illustrated in the examples herein.

Figure 1:
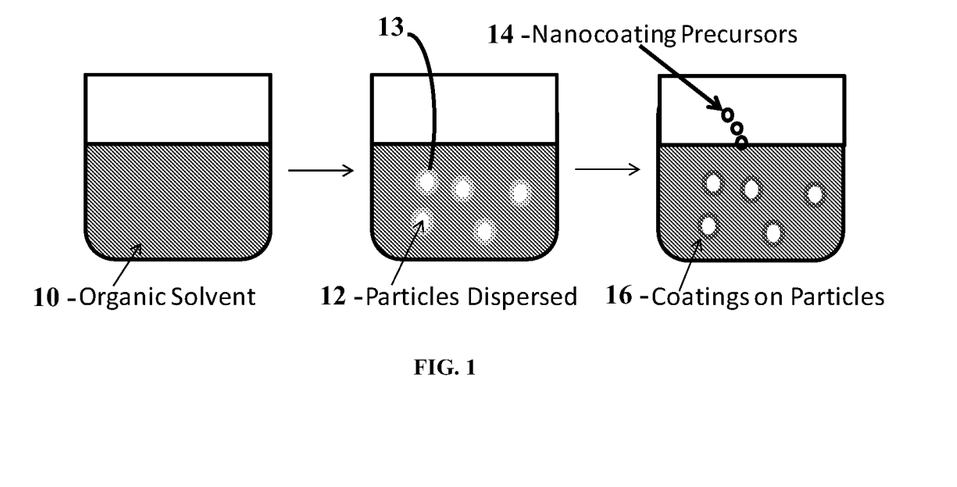
FIG. 1 illustrates a process for coating nanoparticles consistent with the present invention.
Figure 2:
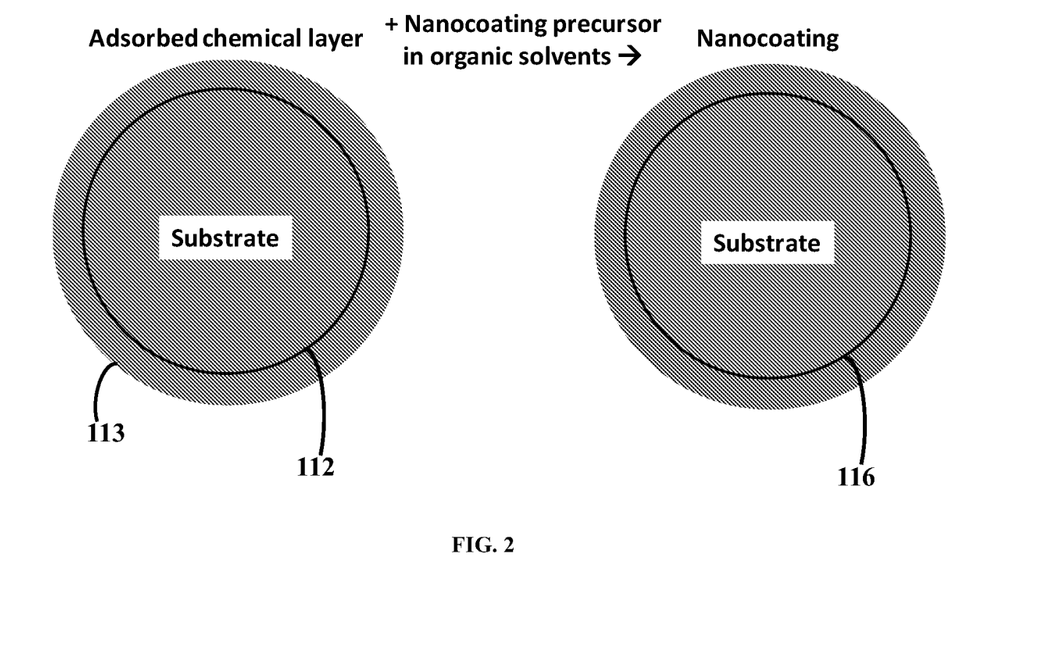
FIG. 2 illustrates the nanocoating formation on a single particle.
Figure 3:
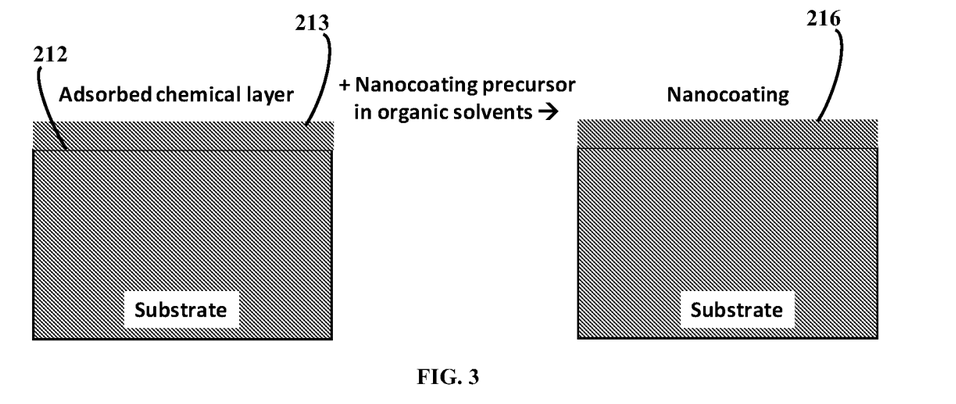
FIG. 3 illustrates the nanocoating formation on a substrate with a flat surface (i.e., a macroscopic substrate).

FIGS. 1-3 illustrate, at a high level, exemplary embodiments of the method of the present invention. FIG. 1 illustrates the coating process on a substrate that is dispersed in an organic solvent.

As shown in FIG. 1, an organic solvent 10 is provided. Particles 12 (the substrate) are subsequently dispersed in the organic solvent 10. The liquid agent (not shown) is added to the organic solvent 10 and adsorbs to the surfaces of the particles 12, thereby forming a liquid agent film 13. The nanocoating precursors 14 are mixed into (e.g., via injection) the particle dispersion, the nanocoating precursors 14 contact the liquid agent film, and a nanocoating 16 forms on the surfaces of the particles 12 due to the reaction of the nanocoating precursors 14 with the liquid agent.

FIG. 2 illustrates the nanocoating of a single particle 112. The particle 112 is dispersed in the liquid organic solvent (not shown). The liquid agent (not shown), which was added to the liquid organic solvent, is adsorbed to the substrate to form a liquid agent film 113. A nanocoating precursor (not shown) is added to the liquid organic solvent, allowed to contact the liquid agent film 113, and a nanocoating 116 forms on the surface of the particle 112 due to the reaction of the nanocoating precursor with the liquid agent.

The substrate 212 shown in FIG. 3 may be nanocoated by one of at least two ways. First, the substrate 212 may be dipped into the liquid organic solvent (not shown). A liquid agent (also not shown) may then be added to the liquid organic solvent. The liquid agent adsorbs to the surface of the substrate to form a liquid agent film 213. The nanocoating precursor (not shown) is subsequently added to the liquid organic solvent and thereby reacts with the liquid agent film 213, thereby forming a nanocoating 216.

Second, a spin-coating process may be utilized. The substrate 212 may be mounted in a spin coater and brought in contact with the liquid organic solvent (not shown) on the surface to be coated. A liquid agent (also not shown) may then be added to the liquid organic solvent. The liquid agent adsorbs to the surface of the substrate to form a liquid agent film 213. The nanocoating precursor (not shown) is subsequently added to the liquid organic solvent during spinning in order to form a nanocoating 216 on the surface of the substrate via reaction of the liquid agent film 213 and the nanocoating precursor.

EXAMPLES

The method of the present invention is illustrated by the following exemplary, non-limiting examples. In each example, the method of the present invention was conducted under an inert atmosphere ($N_2$ gas with $H_2O$ content<10 ppm) in order to prevent the contamination of the reaction mixture with any water vapor present in the air, thereby reducing or eliminating the risk that water vapor may react with the nanocoating precursor. Each example was carried out at room temperature and atmospheric pressure.

Example 1

Forming a Titania Nanocoating on Carbon Nanotubes

A titania nanocoating was formed on carbon nanotubes. Given that carbon nanotubes generally have hydrophobic surfaces due to their graphitic nature, their surfaces were functionalized prior to forming the nanocoating in order to make them hydrophilic so that liquid water could more readily adsorb thereto. Oxidizing acids may be used to do this in order to produce oxygenated species such as OH—, —COOH, —C=O, etc., on the surfaces of the carbon. In connection with the present example, a mixture of sulfuric and nitric acids was used.

Figure 4:
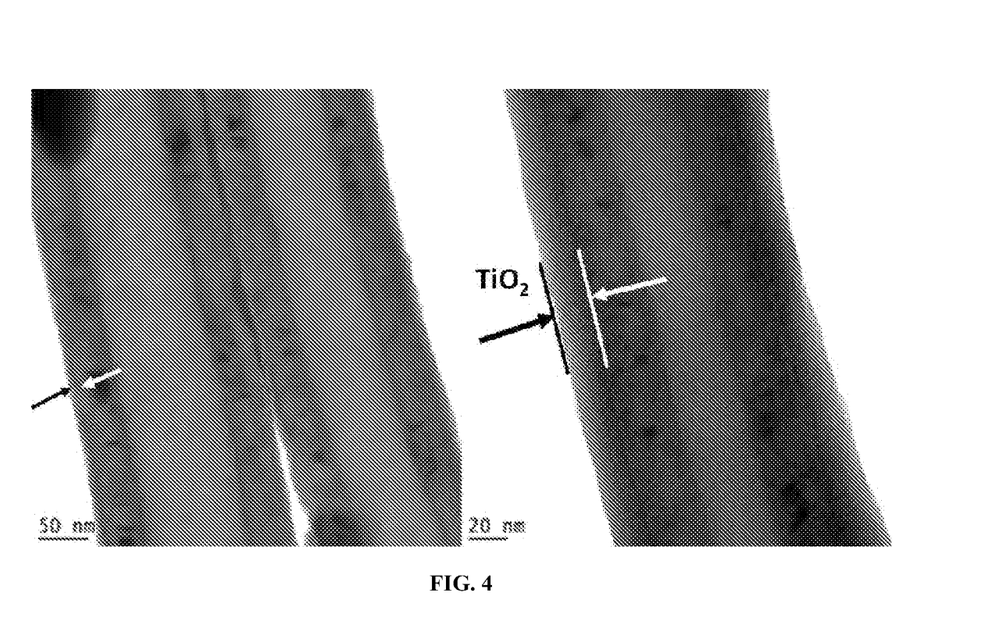
FIG. 4 is an electron micrograph showing titanium oxide nanocoating on carbon nanotubes.

400 mg of functionalized carbon nanotubes were dispersed in 100 ml anhydrous heptane with the help of an ultrasonication probe. Based upon the stoichiometry of the reagents, 500 µL of deionized water was added to the dispersion to make a titania nanocoating of 15 nanometers. Due to the fact that water has very low solubility in heptane, the water formed a liquid water film on the surfaces of the carbon nanotubes. $9.5 \times 10^{-3}$ mole of titanium ethoxide in two (2) ml of heptane was then injected through a syringe into the dispersion. After 10 minutes under sonication, the nanocoated carbon nanotubes were separated from the liquid organic solvent and dried. Electron micrographs of the nanocoated carbon nanotubes were taken after the reaction (see FIG. 4).

Figure 5:
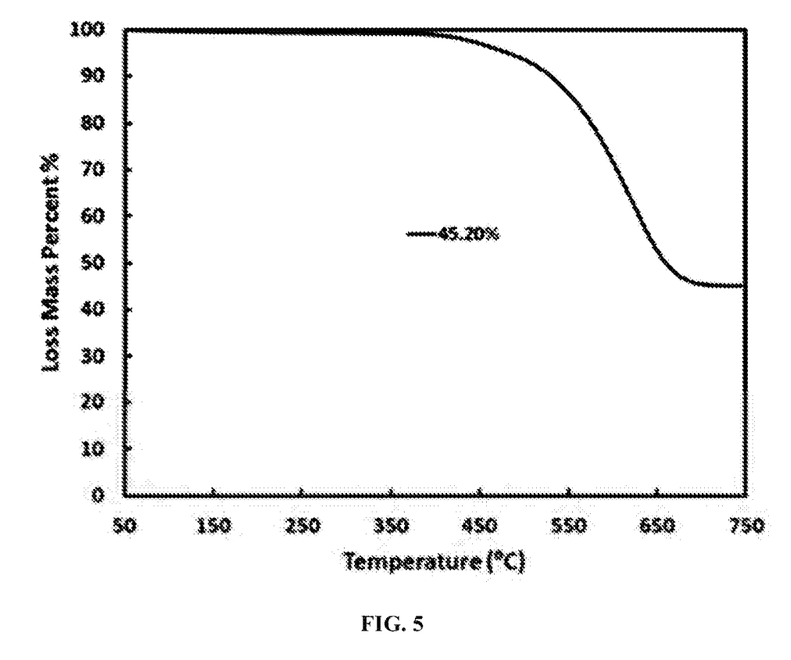
FIG. 5 shows mass loading of $TiO_2$ on carbon nanotubes as measured by thermogravimetric analysis (TGA).

The $TiO_2$ mass loading on the carbon nanotubes was measured by thermogravimetric analysis (TGA) to be 45% by weight, which corresponds to a titania nanocoating of about 15 nm (see FIG. 5).

Example 2

Forming Niobium Oxide Nanocoating on Carbon Nanotubes

Figure 6:
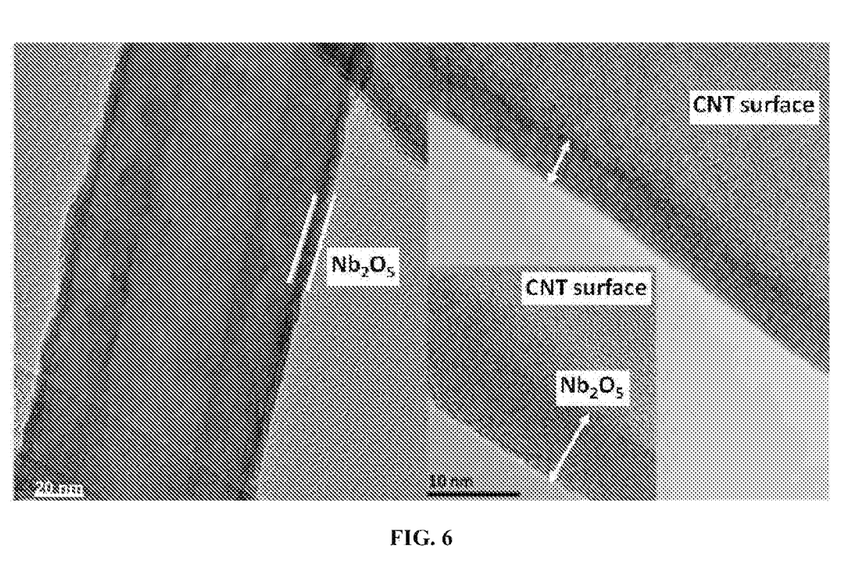
FIG. 6 is an electron micrograph showing niobia on carbon nanotubes.

A niobium oxide nanocoating was formed on carbon nanotubes following a similar process to that set out in Example 1. The carbon nanotubes were functionalized in the same way as the carbon nanotubes of Example 1. The nanocoating precursor utilized was niobium ethoxide. Twenty (20) mg of functionalized carbon nanotubes were dispersed in 30 ml anhydrous heptane with the help of an ultrasonication probe. $3.95 \times 10^{-5}$ mole of niobium ethoxide in 10 µl of heptane was injected through a syringe into the dispersion for reactions. Based upon the stoichiometry of the reagents, 15 µL of deionized water was added to the dispersion to make a niobia nanocoating of about 5 nanometers (see FIG. 6). The reaction was allowed to proceed for fifteen minutes.

Figure 7:
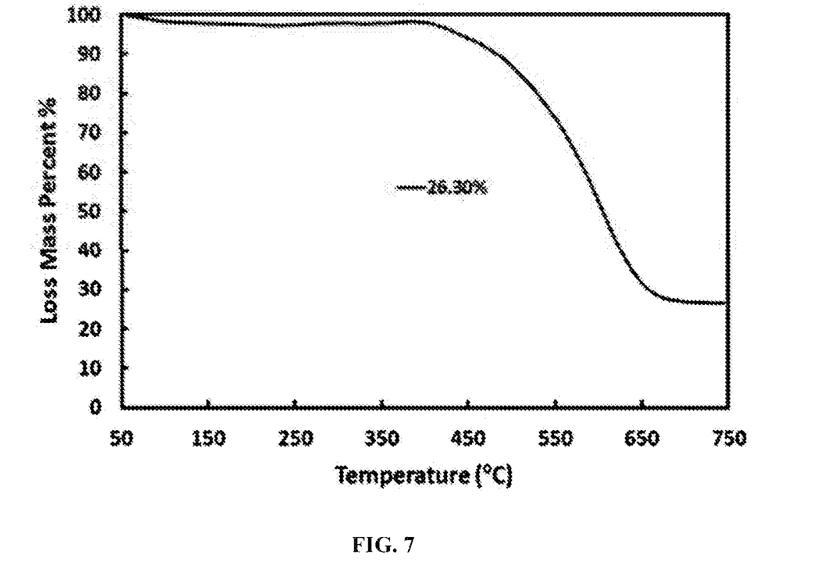
FIG. 7 shows mass loading of $Nb_2O_5$ on carbon nanotubes as measured by TGA.

The $Nb_2O_5$ mass loading on the carbon nanotubes was measured by thermogravimetric analysis (TGA) to be 26.3% by weight, which corresponds to a niobia nanocoating of about 5 nm (see FIG. 7).

Example 3

Forming Nanocoating of Titanium Oxide on Iron Oxide Nanoparticles

A titania nanocoating was formed on iron oxide nanoparticles (Alfa Aesar, 25 nm α-$Fe_2O_3$) following a similar process to that set out in Example 1. Prior to performing the method of the present invention, the iron oxide nanoparticles were submerged in dilute sulfuric acid 0.1 M $H_2SO_4$ in order to reactivate (i.e., functionalize) their surfaces to make them hydrophilic. A very dilute acid was used to avoid dissolution of the iron oxide. Next, the reaction container used to functionalize the iron oxide nanoparticles was purged by $N_2$ gas and washed by water to remove any residue acids. In order to avoid enhancing the magnetic attraction between the iron oxide nanoparticles, a sonication probe was applied to the dispersion of the iron oxide nanoparticles in anhydrous heptane. For the same reason, mechanical stirring was not utilized, as it may cause the iron oxide nanoparticles to aggregate together, in turn reducing the surface area that can be exposed to and react with the titania nanocoating precursor.

Figure 8:
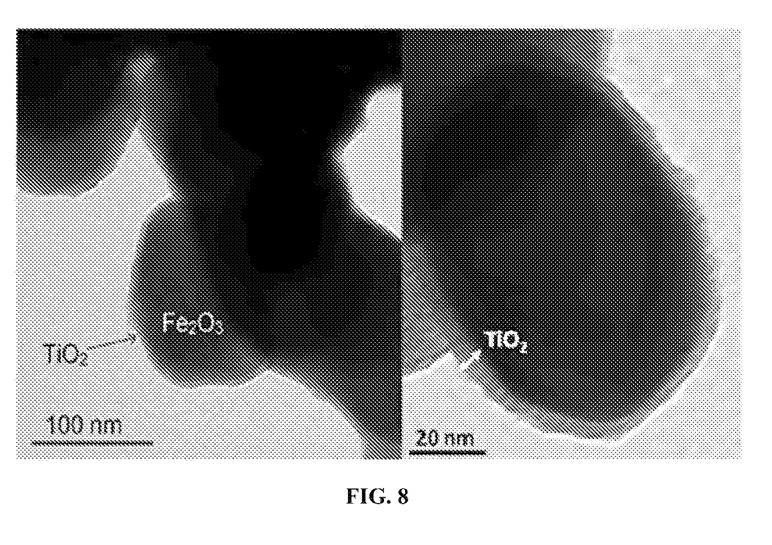
FIG. 8 is an electron micrograph showing titania on iron oxide nanoparticles.

After functionalization, the iron oxide nanoparticles were filtered and dried in a vacuum furnace at 80 degrees Celsius for one hour. 60 mg of the functionalized iron oxides were dispersed in 30 ml anhydrous heptane with the help of an ultrasonication probe. No additional water was added due to the fact that sufficient water from the surrounding atmosphere had already adsorbed to the highly hydrophilic surface of the iron oxide nanoparticles. $2.96 \times 10^{-4}$ mole of titanium isopropoxide (TTiP) in eighty-eight (88) µL of heptane was injected through a syringe into the dispersion for reactions. After 10 minutes under sonication, the nanocoated iron oxide was separated out from the liquid and dried. Electron micrographs of the iron oxide were taken after the formation of the nanocoating (see FIG. 8).

Example 4

Forming Nanocoating of Niobia on P25 Titania Nanoparticles

A niobia nanocoating was formed on commercial P25 titanium oxide nanoparticles following a similar process to that set out in Example 1. The nanocoating precursor utilized was niobium ethoxide. The P25 was treated by sulfuric and nitric acid to increase its hydrophilicity. 80 mg of functionalized P25 were dispersed in 25 ml anhydrous heptane with the help of an ultrasonication probe flow. Based upon the stoichiometry of the reagents, 20 µL of deionized water was added to the dispersion to make a niobia nanocoating of about 5 nm. $3.95 \times 10^{-4}$ mole of niobium ethoxide precursor in 100 µl of heptane was injected through a syringe into the dispersion for reactions.

Figure 9:
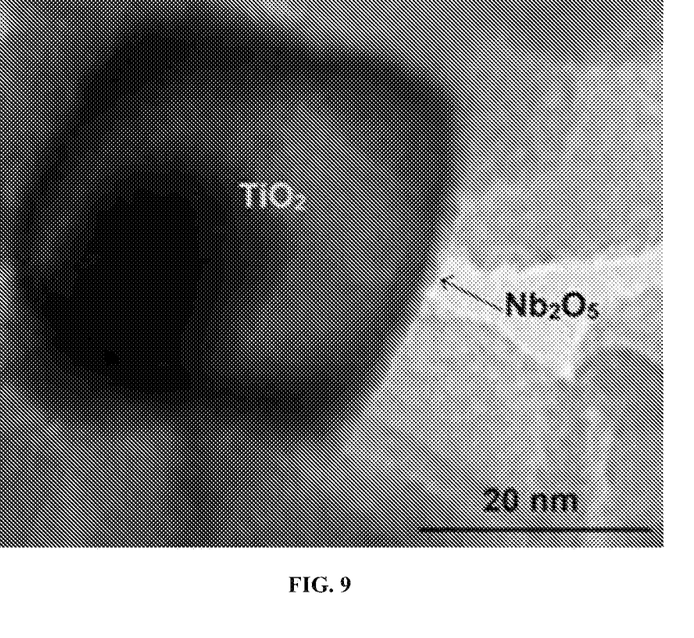
FIG. 9 is an electron micrograph showing niobia on titanium oxide P25 nanoparticles.

After 10 minutes under sonication, the niobia nanocoated P25 were separated out from the liquid and dried. Electron micrographs of the P25 were taken after the formation of the nanocoating. (see FIG. 9).

Example 5

Forming Nanocoating of Alumina on Iron Oxide Nanoparticles

Figure 10:
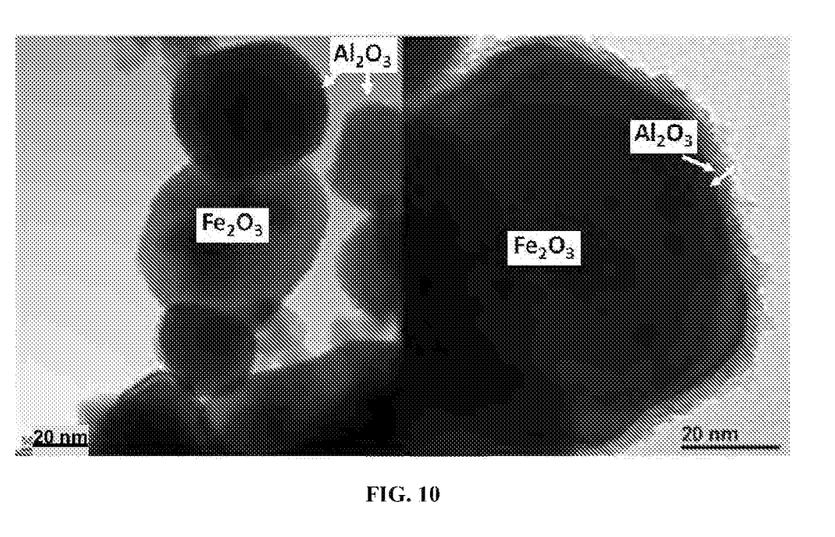
FIG. 10 is an electron micrograph showing alumina on iron oxide nanoparticles.

An alumina nanocoating was formed on iron oxide nanoparticles following a similar process to that set out in Example 1. The nanocoating precursor was trimethyl aluminum, and a 2.0 M solution of trimethylaluminum in heptane was prepared. The surfaces of the iron oxide nanoparticles (Alfa Aesar, 25 nm α-$Fe_2O_3$) were functionalized by placing the iron oxide nanoparticles in dilute acid of 0.1 M $H_2SO_4$. 100 mg of functionalized iron oxide was dispersed in 50 ml of anhydrous heptane with the help of an ultrasonication probe inside a glovebox. No additional water was added due to the fact that sufficient water from the surrounding atmosphere had already adsorbed to the highly hydrophilic surface of the iron oxide nanoparticles. Based upon the stoichiometry of the reagents, 100 μL of the 2.0 M TMA precursor solution was added to the dispersion to form a nanocoating of 5 nm on the iron oxide nanoparticles. The reaction was allowed to proceed for 10 minutes. Electron micrographs of the iron oxide were taken after the formation of the nanocoating (see FIG. 10).

Example 6

Forming Nanocoating of Niobia on Carbon Black Nanoparticles

Figure 11:
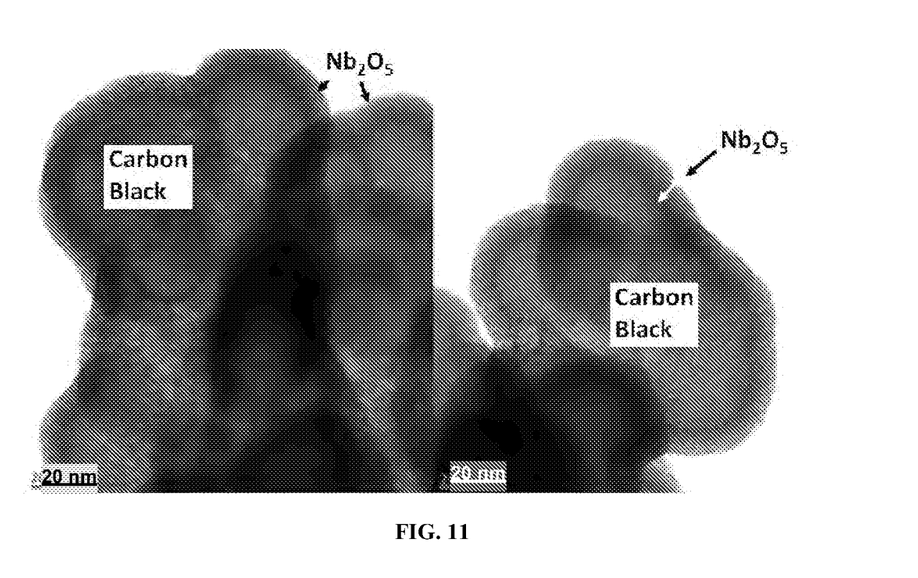
FIG. 11 is an electron micrograph showing niobia on carbon black (CB) nanoparticles.

A niobia nanocoating was formed on carbon black (CB) following a similar process to that set out in Example 2. The CB was functionalized, in a way similar to the CNTs of Example 2. 30 mg of functionalized CB was dispersed in 30 ml anhydrous heptane with the help of an ultrasonication probe. $5.93 \times 10^{-5}$ mole of niobium ethoxide in 15 μl of heptane was injected through a syringe into the dispersion for reactions. Based upon the stoichiometry of the reagents, 15 μL of deionized water was added to the dispersion to make a niobia nanocoating of about 15 nm (see FIG. 11). The reaction was allowed to proceed for 15 minutes.

Figure 12:
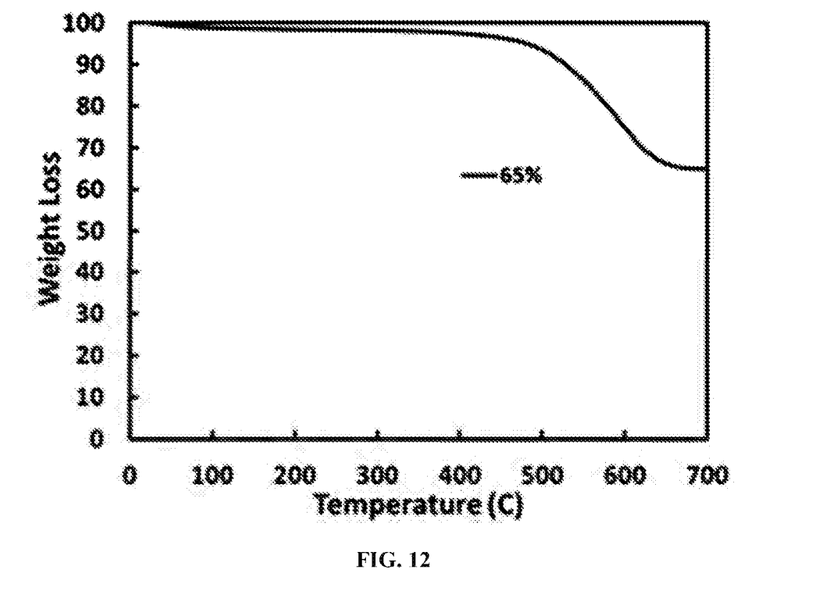
FIG. 12 shows mass loading of niobia on (CB) as measured by TGA.

The $Nb_2O_5$ mass loading on the CB was measured by thermogravimetric analysis (TGA) to be 65% by weight, which corresponds to a niobia nanocoating of about 15 nm (see FIG. 12).

Example 7

Forming Nanocoating of Niobia on Ni-Rich Li-Ion Battery Cathode Powders

Figure 13:
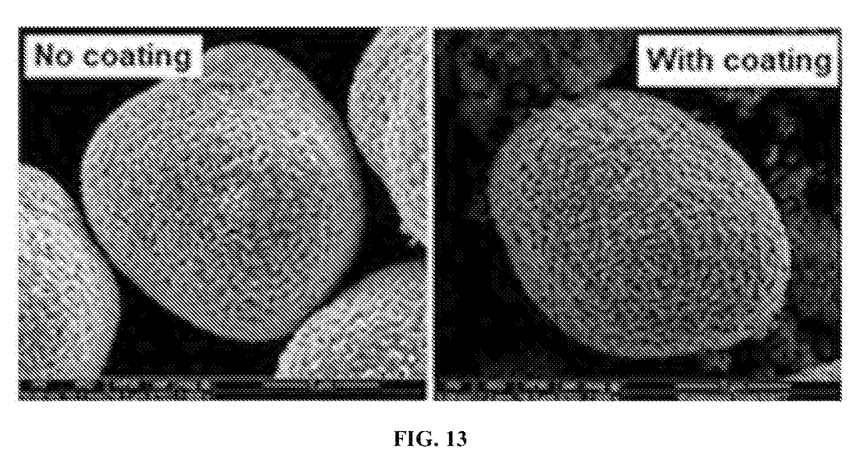
FIG. 13 are electron micrographs showing Ni-rich Li-ion battery cathode powders with and without niobia coatings.
Figure 14:
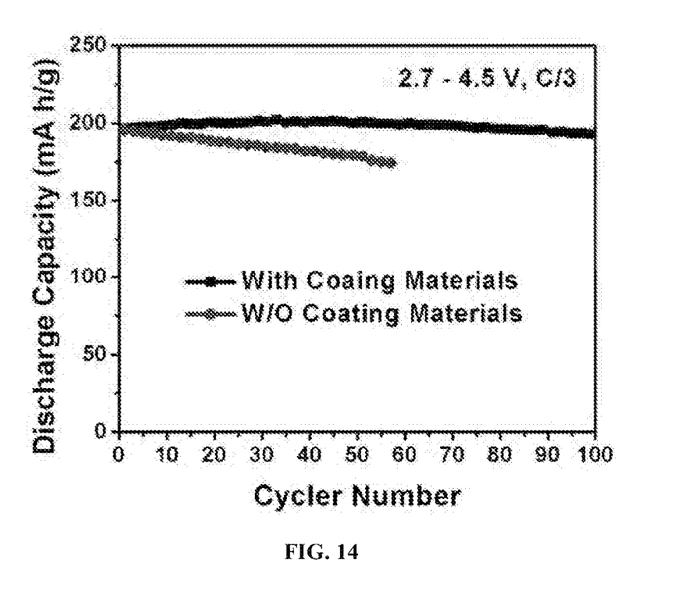
FIG. 14 shows the battery performance of the Ni-rich Li-ion battery cathode powders of FIG. 13.

A niobia nanocoating was formed on Ni-rich Li-ion cathode powders following a similar process to that set out in Example 2. 1 g of a Ni-rich Li-ion cathode powder was dispersed in 50 ml heptane with the help of a sonication probe. The nanocoating precursor utilized was Nb ethoxide. Based upon the stoichiometry of the reagents, $1.383 \times 10^{-3}$ mole (25 μL) of deionized water and $1.976 \times 10^{-4}$ mole of niobium ethoxide in 50 μl of heptane was injected through a syringe into the dispersion for reactions to form niobia nanocoatings. FIG. 13 shows the powder morphology of the Ni-rich Li-ion cathode powders. FIG. 14 shows the battery performance with and without coating and demonstrates that the nanocoated powders performed better than the uncoated powders.

Example 8

Forming Fluffy Nanocoating of Titania on Carbon Nanotubes

Figure 15:
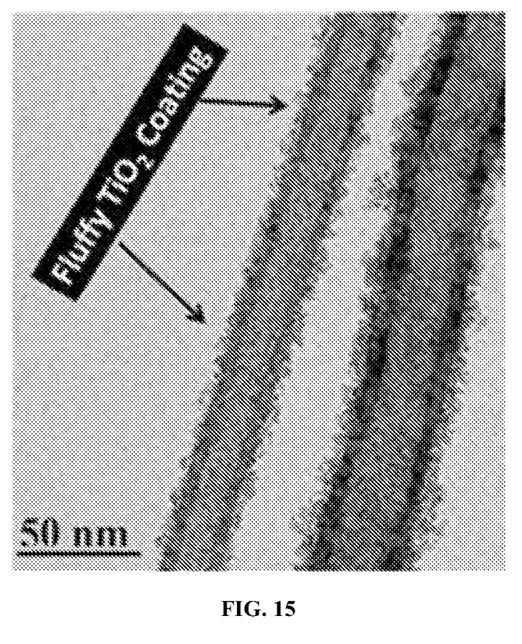
FIG. 15 is an electron micrograph showing a titania nanocoating on carbon nanotubes with a fluffy structure.

A fluffy titania nanocoating was formed on carbon nanotubes following a similar process to that set out in Example 1. Titanium isopropoxide (TTiP) was used as the nanocoating precursor. 100 mg of functionalized carbon nanotubes were dispersed in 50 ml anhydrous heptane with the help of a sonication probe. Deionized water and TTiP were added to the dispersion in a 2 to 1 molar ratio (0.0022 moles of water to 0.0011 mole of TTiP). TTiP is a big-alkoxide molecule with one metal center surrounded by long isopropoxides ligands that exert a considerable bulk steric influence. The reaction of TTiP with water is governed by a polycondensation reactions, leading to polymeric structures with a cross-linked (or fluffy) morphology (see FIG. 15).

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

We claim:

1. A method of forming a nanocoating on a substrate comprising:
   contacting a substrate with a first liquid organic solvent;
   adding a liquid agent to the first liquid organic solvent to form a liquid agent film on a surface of the substrate, wherein the liquid agent consists of components selected from the group consisting of: liquid water, a water solution containing one or more solutes, or combinations thereof; and
   adding a nanocoating precursor in the first liquid organic solvent, wherein the nanocoating precursor reacts with the liquid agent film to form the nanocoating on the surface of the substrate.

2. The method of claim 1, wherein the affinity or attraction between the liquid agent and the substrate is higher relative to the affinity or attraction between the liquid agent and the first liquid organic solvent.

3. The method of claim 2, wherein the liquid agent has a solubility in the first liquid organic solvent of less than 100 parts per million.

4. The method of claim 3, wherein the step of adding the nanocoating precursor in the first liquid organic solvent comprises dissolving the nanocoating precursor in the first liquid organic solvent.

5. The method of claim 3, wherein prior to adding the nanocoating precursor into the first liquid organic solvent, the nanocoating precursor is dissolved in a second liquid organic solvent, and wherein the step of adding the nanocoating precursor in the first liquid organic solvent further comprises adding the combination of the nanocoating precursor and the second liquid organic solvent.

6. The method of claim 5, wherein the contacting step comprises dispersing the substrate in the first liquid organic solvent to form a dispersion.

7. The method of claim 6, wherein a solid volume fraction of the dispersion is between about 0.0001% and about 50%.

8. The method of claim 7, wherein the solid volume fraction of the dispersion is between about 0.001% and about 10%.

9. The method of claim 8, wherein the solid volume fraction of the dispersion is between about 0.01% and 0.1%.

10. The method of claim 5, wherein the contacting step comprises dipping or immersing the substrate in the first liquid organic solvent.

11. The method of claim 5, wherein the contacting step comprises spin-coating the substrate in the first liquid organic solvent.

12. The method of claim 11, wherein the substrate is selected from the group consisting of nanoparticles, nanofibers, microparticles, microfibers, macroscopic surfaces, and combinations thereof.

13. The method of claim 12, wherein the substrate is selected from the group consisting of carbon, metal oxides, metals, ceramics, polymers, and combinations thereof.

14. The method of claim 13, wherein the substrate is selected from the group consisting of carbon nanotubes (CNTs), iron oxide nanoparticles, titania nanoparticles, carbon black (CB), Li-ion cathode powders, silicon powders, silicon nanowires, and combinations thereof.

15. The method of claim 14, wherein the substrate is hydrophilic.

16. The method of claim 15, wherein the hydrophilic substrate is selected from the group consisting of hydrophilic nanoparticles, hydrophilic nanofibers, hydrophilic microparticles, hydrophilic microfibers, hydrophilic macroscopic surfaces, and combinations thereof.

17. The method of claim 5, wherein the second liquid organic solvent is selected from the group consisting of: alkanes, alkenes, alkynes; aliphatic derivatives of alkanes, alkenes, alkynes; aromatic derivatives of alkanes, alkenes, alkynes; and combinations thereof.

18. The method of claim 17, wherein the second liquid organic solvent comprises one or more alkylbenzenes, alkylcyclohexanes, and combinations thereof.

19. The method of claim 17, wherein the second liquid organic solvent is the same as the first liquid organic solvent.

20. The method of claim 1, wherein the nanocoating precursor is one or more metalorganics.

21. The method of claim 20, wherein the one or more metalorganics are selected from the group consisting of metal alkoxides, metal alkyls, derivatives of metal alkoxides, derivatives of metal alkyls, and combinations thereof.

22. The method of claim 21, wherein the one or more metalorganics is selected from the group consisting of titanium ethoxide, titanium tetraisoproxide, trimethyl aluminum, diethyl zinc, niobium ethoxide, and combinations thereof.

23. The method of claim 1, wherein the first liquid organic solvent is selected from the group consisting of: alkanes, alkenes, alkynes; aliphatic derivatives of alkanes, alkenes, alkynes; aromatic derivatives of alkanes, alkenes, alkynes; and combinations thereof.

24. The method of claim 23, wherein the first liquid organic solvent comprises one or more alkylbenzenes, alkylcyclohexanes, and combinations thereof.

25. The method of claim 1, wherein the nanocoating is selected from the group consisting of metal oxide, metal hydroxide, and combinations thereof.

26. The method of claim 25, wherein the nanocoating is selected from the group consisting of titania, niobium oxide, niobia, alumina, and combinations thereof.

27. The method of claim 1, wherein the one or more solutes is one or more metal salts.

* * * * *